Oct. 13, 1925.
H. JACOB
1,556,994
AIMING DEVICE WITH OPTICAL REFLECTING SYSTEM FOR MOVING STATIONS
Filed Aug. 23, 1921
Fig. 1. Fig. 2. Fig. 3. Fig. 4.
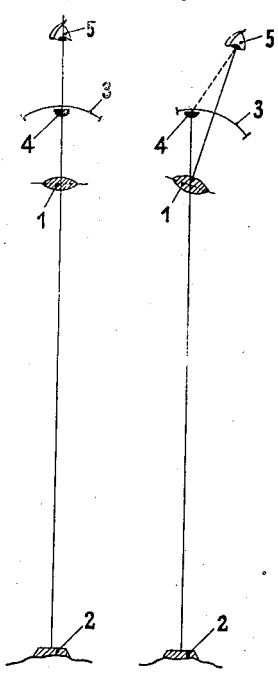
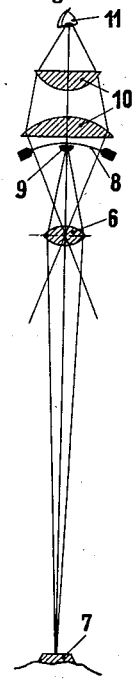
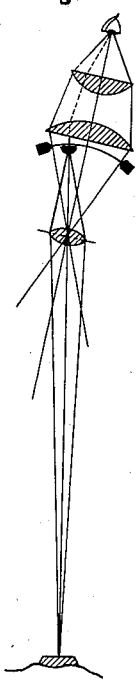
Fig. 5. Fig. 6. Fig. 7.
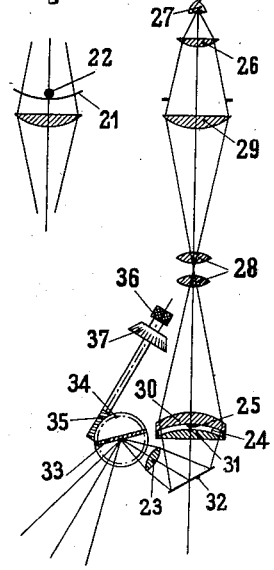
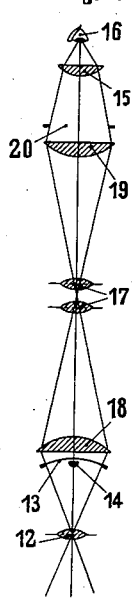
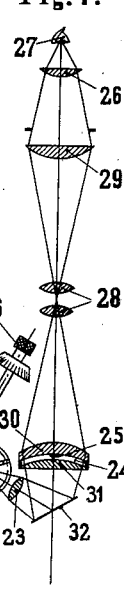
Fig. 8.
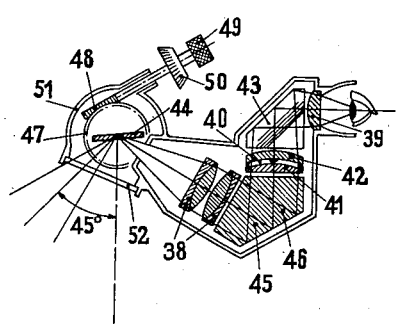
Inventor:
Heinrich Jacob
by Leo J. Matty atty.

Patented Oct. 13, 1925.

1,556,994

UNITED STATES PATENT OFFICE.

HEINRICH JACOB, OF FRIEDENAU, NEAR BERLIN, GERMANY, ASSIGNOR TO THE FIRM OPTISCHE ANSTALT C. P. GOERZ AKTIENGESELLSCHAFT, OF FRIEDENAU, NEAR BERLIN, GERMANY.

AIMING DEVICE WITH OPTICAL REFLECTING SYSTEM FOR MOVING STATIONS.

Application filed August 23, 1921. Serial No. 494,452.

*To all whom it may concern:*

Be it known that I, HEINRICH JACOB, a citizen of the German Republic, and resident of Friedenau, near Berlin, Germany, have invented certain new and useful Improvements in and Relating to Aiming Devices with Optical Reflecting Systems for Moving Stations (for which I have filed applications in Germany November 6, 1914; Hungary May 10, 1917; Austria May 22, 1915; Sweden July 24, 1919; Switzerland September 17, 1919), of which the following is a specification.

This invention relates to an aiming-device with an optical system for producing images of the objects under observation and an arrangement to make the direction of observation independent from the oscillations of the carrier in the space with relation to the vertical direction.

Such aiming-devices are of particular importance for aircrafts and other movable stations, as f. i. ships, easily movable gun-carriages, etc.

In employing aiming-devices on movable carriers of this kind, it is difficult to keep up an aiming direction within a certain angle relative to the vertical direction.

The present invention has for its object, to overcome such difficulties and secures this effect by providing the aiming-device with a level within its field of view in such arrangement that the movements of the level correspond in direction and extent to the movements of the object as brought to the perception of the observer by the aiming-device, viz, such movements, which the object seems to make owing to the oscillations of the station.

In such an arrangement and when employing a level with ring shaped receptacle as indicating-medium for the vertical direction, the bubble or ball of the level can by itself be used for direct reading, provided that curvature and arrangement of the level are properly selected relative to the image producing optical system.

The invention is illustrated by the accompanying drawings in Figs. 1–7 mainly diagrammatically and in Fig. 8 by illustrating a special embodiment of a device constructed in accordance with the invention.

Figs. 1 and 2 illustrate diagrammatically the optical principles of the invention.

Figs. 3 and 4 illustrate an optical system consisting of objective and ocular with the novel arrangement of the level and the effect of the system under two different positions of the aiming-device within the space.

Fig. 5 illustrates the optical system of a terrestrial telescope constructed as aiming-device in accordance with the invention.

Fig. 6 shows a modified arrangement of the level within the optical system.

Fig. 7 shows likewise a terrestrial telescope for aiming with the novel level arrangement and means for adjusting the instrument on any desired aiming-angle.

Fig. 8 shows a complete prism telescope with the novel level arrangement.

In Figs. 1 and 2 the image producing objective is marked 1, 2 designates a certain target-point, f. i. a fortress or the like, 3 is a round box-level, the bubble of which is marked 4, and 5 is the eye of the observer. According to Fig. 1, the straight line connecting the objective 1 and the eye 5, stands vertical to the horizontal plane and cuts the target-point 2 by its elongation.

Supposing f. i. that it is intended to throw a bomb from a balloon in position of rest, which carries the aiming-device, so as to strike the target 2, dropping would have to be effected in the moment, in which the vertical standing connecting-line between objective 1 and eye 5 cuts the target-point 2, as illustrated in Fig. 1.

The fact, that the direction of vision towards the target 2 in the moment of dropping the bomb stands vertically to the horizontal plane, can be ascertained from the showing of the instrument that the bubble 4 coincides with the image of the target. If the balloon, carrying the aiming-device, does not vary its position, but oscillates in the air, the case illustrated in Fig. 2 may happen, wherein the objective is located vertically above the target 2, the axis of the aiming-device however, which is marked by the connecting-line of the eye 5 with the objective 1, stands inclined. Though the balloon is therefore standing at the point, where a bomb thrown from it would hit the target 2, the aiming-device is still not pointed towards the target. During inclination of the balloon the bubble has moved from the point illustrated in Fig. 1, where it rests upon the connecting-line between eye 5 and objective 1, sideways into the position illustrated in Fig. 2 and falls, as shown in Fig. 2, still in line with the image of the target 2 produced by the objective. This is caused by the curve given to the level and its arrangement with relation to the picture producing objective 1. The radius of the curve of the level 3 is made equal to the focal distance of the objective 1. The level has been located within the image plane of the objective 1.

In consequence of this arrangement, the movements of the bubble 4 correspond during oscillation of the balloon regarding direction and extent exactly to the movements which the target 2 seems to undergo and the fact of the alignment of the image of the target 2 with the bubble 4 of the level gives to the observer always the assurance, that the target-point is exactly located below his position of observation.

By inserting a mirror in front of the objective, coincidence between picture and bubble of the level could of course be obtained for target-points within any desired angle relative to the vertical, provided that the mirror is given a proper inclination towards the vertical.

According to Figs. 3 and 4, 6 designates the objective of a modified arrangement of the aiming-device, 7 is a target-point, 8 a level, 9 the bubble of the level, 10 the two lenses of an ocular, 11 the eye of the observer. The level 8 with the bubble 9 has been arranged with relation to the objective 6 in the same way as shown in Figs. 1 and 2. The level has again a curve radius equal to the focal distance of the odjective 6. In this instance the bubble of the level moves likewise during oscillation of the carrier of the instrument so that if the target-point 7 is located vertically below the objective 6, the image of the target coincides with the bubble of the level, whatever inclination the axis of the aiming-device, connecting the eye 11 with the centre of the objective 6 may have relative to the vertical. The arrangement of the optical elements in Figs. 3 and 4 is that of an astronomical telescope presenting to the observer images up-side-down.

According to Figs. 5 and 6 image reversing systems have been inserted into the optics of the aiming-device. The image reversing system is according to Fig. 5 inserted between the first image and the eye-lens. The objective is marked 12, the level 13, and its bubble 14, the eye-lens 15, the eye of the observer 16, and the image reversing system 17. 18 and 19 are two collective lenses. In the optical effect nothing is altered by the insertion of the reversing system 17 behind the first image plane of the objective 12 in which the level is located so that the image produced by the objective moves again uniformly and in like direction with the bubble of the level within the field of view, as has been stated in connection with Figs. 1-4.

If the level would be placed within the second image plane 20 instead of within the first image plane of the objective 12, the movements of the image would as plainly seen from the graphically shown rays be reversed as illustrated in Figs. 1-5.

A level located in an image plane of the instrument having its curved surface substantially in parallelism to the surface of the earth ball, that is to say which has its convex side directed towards the eye of the observer, would not bring about the desired effect. A counter-movement between the target image and the bubble of the level with a negative curve as shown in Fig. 6, would then have to be employed. The curve of this level would even in this case have to be equal to the focal distance of the optical system in front of the level, viz optically speaking, equal to the equivalent focal distance of the entire optical system consisting of the lenses 12, 17, 18 and 19. In this case, the bubble of the level 21 would have to be replaced by a ball 22 reacting upon gravity.

In Fig. 7 an instrument with refracted optical axis is illustrated, the optical elements of which correspond to those appearing in Fig. 5. The objective is marked 23, the level 24, the bubble 25, the eye-lens 26, the eye of the observer 27; 28 is the reversing system and 29 the upper collective lens. The lower collective lens is assembled of two parts 30 and 31 and forms the body of the level. Two mirrors 32 and 33 are inserted into the course of rays of which the latter is connected with a worm-wheel 34 engaging a worm 35, adapted to be rotated by an adjustment wheel 36. The respective inclination of the mirror 33 can be read from the position of the scale drum 37. With the aid of this accessory mirror-arrangement, target-points appearing under any inclination towards the horizontal can be held coinciding with the bubble of the level 24 so that the bubble 25 forms independent from the oscillations of the carrier of the aiming-device the point of discharge.

In the prism telescope case according to Fig. 8, the objective is marked 38, the ocular 39, the level 40, the body of which is again as in Fig. 7 formed by two lenses 41 and 42 together forming the collective. 43 is an image reversing roof shaped prism, 44 an entrance reflector coinciding with the entrance pupil of the instrument in order to get as small a range as possible. 45 is a prism with reflecting surface 46 inserted between the objective 38 and the level lenses 41, 42 counter acting the optical effect of the mirror 44 upon the position of the image. The mirror 44 is firmly connected with a worm-wheel 47 engaging a worm 48 and turned by means of a handwheel 49 with pitch-circle 50. 51 is a cover for the mirror 44 and 52 a plane parallel covering plate.

The use of the instrument illustrated in Fig. 8 is obvious in view of what has been said with regard to Figs. 1 and 2.

The rays coming from a target-point are transferred to the objective 38 by a mirror 44 and pass from there to the reflector surface 46 through the collective 41, 42 in order to appear after reflection upon the roof surfaces of the prism 43, in the eye-lens 39. If the carrier of the instrument, f. i. a balloon, or flying machine, makes oscillations, the image of a certain target moves within the field of view of the observer. The bubble of the level 40 moves simultaneously in the field of view, viz in the same direction and to the same extent, as the level 40 is arranged within the image plane of the objective 38 and has a curve radius equal to the focal distance of the objective. The bubble of the level forms therefore during all longitudinal and cross oscillations of the flying machine the aiming direction upon the target point. By turning the hand wheel 49 it is possible to adjust the mirror 44 so that the bubble of the level 40 forms the aiming-line for target-points covering any prescribed angle with the vertical.

According to the illustration, the position assumed for the mirror 44 corresponds to an extreme angle of 45°.

The prism telescope illustrated in Fig. 8 would be especially suitable for developing the same into a double telescope. In this case the level would preferably only be provided in one half of the telescope and have the effect, that no part would be cut off from the field of view by the bubble of the level, as the part cut out in one half would be supplemented by the undisturbed image of the other half. The instrument might be developed in manner known as binocular thus that only the one half would have the character of an optical instrument for observation while the other half offers to the eye only the level at a suitable point.

In this case care has only to be taken that location and curve of the level are so related towards each other and so placed towards the constants of the optical observing instrument that the condition is given, under which the image of the target moves within the observing half of the instrument during oscillations of the carrier in the same manner as the bubble of the level.

If the focal distance of the telescope would f. i. be equal to the focal distance of the loupe with which the level is observed, the curve radius of the level would have to be equal to the equivalent focal distance of the objective system of the observing telescope.

What I claim is:

1. Aiming device for aircraft and stations movable with relation to the direction of gravity, comprising an optical system adapted to produce an image of a target and a level having a spherical surface and a bubble moving in contact therewith, said spherical surface and bubble of the level located substantially in an image plane of said optical system, the radius of curvature of the spherical surface of the level being equal to the equivalent focal length of the optical system provided between the target and the level, the bubble of the level forming the sight of the instrument.

2. In an aiming telescope an optical system adapted to produce an image of an object viewed at, a level located in an image plane of said optical system and having spherical curved surface and a bubble in contact therewith, the radius of curvature of said spherical curved surface of the level being equal in length to the equivalent focal length of the optical system, the bubble of the level forming the sight of the telescope, a pair of reflectors arranged one behind the other in front of said level in the path of the rays coming from an object viewed at, one of said reflectors being adjustably located close to the entrance pupil of the image producing optical system.

3. In an aiming telescope an optical system adapted to produce an image of an object viewed at, comprising an objective, an ocular and a collective, a level built up out of lens elements forming together a collective of the said optical system, the bubble of the level forming the sight of the instrument, a roof shaped prism between the level and the ocular and a pair of reflectors in front of the level on opposite sides of the objective, one of said reflectors being adjustably located close to the entrance pupil of the image producing system.

In testimony whereof I have signed this specification.

HEINRICH JACOB.